United States Patent [19]

Chang et al.

[11] Patent Number: 5,346,788
[45] Date of Patent: Sep. 13, 1994

[54] MICROPOROUS POLYURETHANE BASED BATTERY SEPARATOR

[75] Inventors: Victor S. C. Chang, Ellicott City; Richard C. Hartwig, Laurel, both of Md.; Joseph T. Lundquist, Gilroy, Calif.; Marc E. Parham, Bedford; Anthony J. Laccetti, North Andover, both of Mass.

[73] Assignee: W.R. Grace & Co.-Conn., New York, N.Y.

[21] Appl. No.: 41,740

[22] Filed: Apr. 1, 1993

[51] Int. Cl.$^5$ .............................................. H01M 2/16
[52] U.S. Cl. .................................... 429/244; 429/251; 429/252
[58] Field of Search ......................... 429/249, 251, 252

[56] References Cited

U.S. PATENT DOCUMENTS

| | | |
|---|---|---|
| 2,953,622 | 9/1960 | Gray . |
| 3,036,143 | 5/1962 | Fisher et al. . |
| 3,351,495 | 11/1967 | Larsen et al. . |
| 3,419,430 | 12/1968 | Michaels . |
| 3,419,431 | 12/1968 | Michaels . |
| 3,450,650 | 6/1969 | Murata . |
| 3,632,404 | 1/1972 | Dessuminiers et al. . |
| 3,651,030 | 3/1972 | Desumminiers et al. . |
| 3,696,061 | 10/1972 | Selsor et al. . |
| 3,709,841 | 1/1973 | Quentin . |
| 3,749,604 | 7/1973 | Langer et al. . |
| 3,766,106 | 6/1971 | Yurimota et al. . |
| 3,853,601 | 12/1974 | Taskier . |
| 3,855,122 | 12/1974 | Bourganel . |
| 3,900,341 | 8/1975 | Schoichiro et al. . |
| 3,933,561 | 1/1976 | Larson et al. . |
| 4,008,203 | 2/1977 | Jones et al. . |
| 4,024,323 | 5/1977 | Versteegh . |
| 4,072,802 | 2/1978 | Marata et al. . |
| 4,098,930 | 7/1978 | Nakayama et al. . |
| 4,153,760 | 5/1979 | Sundberg et al. . |
| 4,201,838 | 5/1980 | Goldberg . |
| 4,210,998 | 7/1980 | Gaunt . |
| 4,221,846 | 9/1980 | Armstrong et al. . |
| 4,243,562 | 1/1981 | Petit . |
| 4,251,605 | 2/1981 | Inone et al. . |
| 4,273,903 | 6/1991 | Rose . |
| 4,286,015 | 8/1981 | Yoshida et al. . |
| 4,287,276 | 9/1981 | Lundquist et al. . |
| 4,351,860 | 9/1982 | Yoshida et al. . |
| 4,481,260 | 11/1984 | Nohmi . |
| 4,529,646 | 7/1985 | Sundet . |
| 4,650,730 | 3/1987 | Lundquist et al. . |
| 4,681,750 | 7/1987 | Johnson et al. . |
| 4,699,857 | 10/1987 | Giovannoni et al. . |
| 4,714,663 | 12/1987 | Arnold et al. . |
| 4,721,568 | 1/1988 | Henrious . |
| 4,731,304 | 3/1988 | Lundquist et al. . |
| 4,755,299 | 7/1988 | Briischke . |
| 4,776,999 | 10/1988 | Kohn . |

FOREIGN PATENT DOCUMENTS

| | | |
|---|---|---|
| 4959167 | 10/1972 | Japan . |
| 565022 | 10/1942 | United Kingdom . |
| 1107782 | 3/1968 | United Kingdom . |

*Primary Examiner*—Prince Willis, Jr.
*Assistant Examiner*—M. Nuzzolillo
*Attorney, Agent, or Firm*—Howard J. Troffkin

[57] ABSTRACT

A battery separator composed of a microporous sheet product having first and second major surfaces and a thickness of less than about 50 mils, formed from a uniform mixture of a thermoplastic polyurethane polymer having a high degree of hard segments with a filler or said polyurethane with a structure enhancing agent, said sheet product having a sheet embedded within said mixture and between the first and second major surfaces. The sheet product has porosity of at least about 50 volume percent composed of pores such that the nominal pore diameter increases from each major surface towards the interior, center of the sheet product's thickness.

17 Claims, No Drawings

MICROPOROUS POLYURETHANE BASED BATTERY SEPARATOR

BACKGROUND OF THE INVENTION

The subject invention is directed to a sheet product which is useful in providing separator components for batteries and to improved batteries containing the formed separator. More specifically, the present invention is directed to a thin microporous sheet product composed of a highly filled polymeric matrix or a low-level filled (including unfilled) polymer matrix having a porous sheet embedded between the sheet product's first and second major surfaces and having an average pore size distribution across the thickness of the sheet product such that there is a gradient of nominal pore size increasing from each major surface towards the central, interior portion of the sheet product's thickness.

Membranes have been formed from various materials and used in various applications such as in ion exchange, osmotic and ultra filtration devices including desalinazation, kidney dialysis, gas separation and other applications. Macro and microporous membranes have been used as a means of insulating and separating electrodes in battery devices. Each application provides an environment and a set of desired parameters which are distinct to the specific application.

Storage batteries have at least one pair of electrodes of opposite polarity and, in general, have series of adjacent electrodes of alternating polarity. The current flow between these electrodes is maintained by an electrolyte which may be acidic, alkaline, or substantially neutral depending upon the nature of the battery system. Separators are located in batteries between adjacent electrodes of opposite polarity to prevent direct contact between the oppositely charged electrode plates while freely permitting electrolytic conduction. Separator components have taken many forms. In a modern battery design, the separator is in the form of a thin sheet or film or more preferably, a thin envelope surrounding each electrode plate of one polarity.

It is generally agreed that one of the critical elements in a battery design is the separator component and, to be highly effective in the design, the separator should have a combination of features. The battery separator must be resistant to degradation and instability with respect to the battery environment, including the other battery components and the battery chemistry. Thus, the battery separator must be capable of withstanding degradation of strong acids (such as sulfuric acid commonly used in acid battery designs) or strong alkali (such as potassium hydroxide used in alkaline battery designs) and to do so under ambient and elevated temperature conditions. Further, the separator should also be of a thin and highly porous character to provide a battery of high energy density. Although battery separators of thick or heavy design have been utilized in the past, such materials detract from the overall energy density of the battery by reducing the amount of electrodes that can be contained in a predetermined battery configuration and size. Another criteria is that the battery separator must be capable of allowing a high degree of electrolytic conductivity. Stated another way an effective separator membrane must exhibit a low electrical resistance when in the battery. The lower the electrical resistance the better the overall battery performance will be. A still further criteria is that the separator should be capable of inhibiting formation and growth of dendrites. Such dendrite formation occurs during battery operation when part of the electrode material becomes dissolved in the electrolyte and, while passing through the separator, deposits therein to develop a formation which can, after a period of time, bridge the thickness of the separator membrane and cause shorting between electrodes of opposite polarity.

In addition to meeting the above combination of properties, it is highly desired to have a sheet product which is capable of exhibiting good physical properties of tensile strength, flexibility and ductility to withstand the handling and processing without developing imperfections and cracks which would cause the sheet product to be unsuitable as a battery separator. Meeting this criteria is contrary to some of the above described properties (i.e. thin and light weight material and high porosity to provide good conductivity). In providing envelope type separators, these physical properties must also be accompanied by the ability of the material to be sealable by heat, or other means so as to provide a pocket design. As part of the physical property requirements, the sheet product must be capable of exhibiting a high degree of integrity during formation and use.

Various microporous membranes or sheet materials have been suggested for utilization as a battery separator. Separators conventionally used in present battery systems are formed of polymeric films which when placed in an electrolyte or an electrolyte system, are capable of exhibiting a high degree of conductivity while being stable to the environment presented by the battery system. The films include macroporous as well as microporous materials. The porosity permits transportation of the electrolyte. Examples of such separators include unfilled polyolefin sheets which have been stretched and annealed to provide microporosity to the sheet, such as is described in U.S. Pat. Nos. 3,558,764; 3,679,538; and 3,853,601. In addition, polyolefin separators which include filler materials are disclosed in U.S. Pat. Nos. 3,351,495 and 4,024,323. In general, such polymer/filler compositions are friable materials and tend to exhibit electrical resistance which does not permit the formation of a highly efficient, high energy battery system. Other polymeric materials have been used to form battery separators but, in general, are not capable of forming a very thin, microporous sheet having the above properties. Although polyurethanes are well known polymers and are used in a variety of applications, they have had limited utility in forming battery separators due to their presumed instability in battery environments.

It is highly desired to have a battery separator which is capable of exhibiting very low electrical resistance while at the same time providing the combination of properties described above.

SUMMARY OF THE INVENTION

The present invention is directed to a microporous sheet product, battery separators formed therefrom and to improve batteries which incorporate the thus formed battery separator. The subject separator comprises a microporous sheet product composed of a polyurethane polymer substantially uniformly mixed with a filler and/or with a polycarboxylic acid polymer salt or a polysulfonic acid polymer salt, as defined hereinbelow, and which has a porous sheet embedded therein which has a pore structure distribution throughout the thickness such that the nominal pore size of pores increases incrementally from each major surface to the interior, central portion of the sheet product's thickness.

DETAILED DESCRIPTION

The present invention provides a flexible sheet material having high void volume, porosity of a microporous nature and a configuration which substantially inhibits dendrite formation. The subject sheet product has high tensile strength and ductility sufficient to withstand handling during battery formation, is capable of being formed into desired shapes for use in a battery, is capable of exhibiting a high degree of stability to battery environment over sustained periods of time and of allowing a high degree of electrical conductivity (low electrical resistance). Still further, the subject sheet material has been found to possess the ability to maintain its integrity and performance characteristics while being able to be formed into a pocket design separator (i.e. not crack or produce voids when being folded on itself and/or manipulated into this preferred design).

The sheet product of the present invention should be in the form of a very thin sheet of less than 50 mils, and preferably less than 10 mils in thickness. The thin sheet is bound by two major surfaces with a thickness therebetween. The body making up the thickness is composed of a substantially uniform composition formed from a polyurethane polymer and particulate filler and/or with a polycarboxylic acid or polysulfonic acid polymer salt, each of which is fully described hereinbelow.

The body, in addition, contains therein a porous sheet extending the length and breadth of the present sheet product and substantially contained between the present sheet products two major surfaces.

For purposes of clarity, certain terms used in the present description and in the appended claims have the following meanings:

A "sheet" is intended to define a unitary article having a large surface and used herein to refer to a scrim or a woven or non-woven knit material used as a component of the subject separator.

A "battery" refers to a single electrochemical cell or, alternately, a multiple of electrochemical cells which are designed to operate in coordination with each other.

A "separator" is a component of a battery which provides a means of separation between adjacent electrode plates or members of opposite polarity. The separator of the present invention may have various configurations, such as a flat or ribbed material in the form of a membrane or envelope design capable of maintaining separation between electrodes.

A "sheet product" is intended to define a composite product of the present invention which is microporous, has pore size distribution across its thickness such that there is a gradient of nominal pore size which increases from each major surface of the sheet product towards its interior central portion without a major change occurring at the region adjacent to each major surface, has a porous support sheet substantially contained within the center portion of the sheet product's thickness and has a formed of a polymer-filler composite or a polyurethane/(surfactant agent) composite (with or without filler). The sheet product can be used to form separators suitable as a battery component.

The term "polycarboxylic acid polymer salt" is intended to define a hydrocarbon polymer having a multiplicity of aliphatic carboxylic acid units pendent from the polymer chain with at least a portion of said acid units in the form of a salt.

The term "polyacrylic acid polymer salt" is intended to define a polycarboxylic acid polymer salt having a multiplicity of unsaturated aliphatic carboxylic acid units of the general formula $C_nH_{2n-2}O_2$ such as acrylic acid ($C_2H_3COOH$), crotonic acid, vinyl acetic acid as well as ($C_1$-$C_3$ alk)acrylic acid such as methacrylic acid and the like and copolymers of said acids or with other non-acid comonomer, such as acrylonitrile, alkylenes, acrylic acid esters, alkacrylic acid esters, polyalkenyl ethers and the like. At least a portion of the acid groups are in salt form.

The term "polysulfonic acid polymer salt" is intended to define a hydrocarbon polymer having a plurality of aliphatic or aromatic sulfonic acid or sulfonyl chloride units pendent from the polymer chain and at least a portion of the acid groups are in salt form.

The polymers used to form the body of the subject battery separator is selected from thermoplastic polyurethanes having a major amount of hard segments therein. The term "hard segment" refers herein and in the appended claims to polymer claim units derived from the reaction of an organic polyisocyanate with low molecular weight polyols. Such hard segment units contrast to "soft segment" polymer chain units formed from an organic polyisocyanate and a high molecular weight polyol. The polyurethanes of use in the present invention comprise the reaction product of a) an organic polyisocyanate, b) an active hydrogen containing, isocyanate-reactive material having a minor amount of an average functionality of at least 1.9, a glass transition temperature of less than 20° C. and a molecular weight of from about 500 to about 20,000; and c) at least one active hydrogen containing, isocyanate reactive material having a functionality of from 2 to 3 and a molecular weight of from about 50 to about 400. The polyurethane is formed from proportions of the above components so that the resultant polymer has from about 0 to about 20 weight percent of component (b) therein and the overall ratio of isocyanate groups to total active hydrogen groups in the reactants (a), (b) and (c) is in the range of from 0.95:1 to 1.05:1. Such materials are disclosed in U.S. Pat. Nos. 4,376,834 and 4,567,236, the teachings of which are incorporated herein by reference.

Specifically, the components (a), (b) and (c) must be chosen from materials which are substantially inert with respect to the battery environment for which the separator will be employed.

Specifically, the polyisocyanate can be any alkylene, arylene, alkarylene or aralkylene polyisocyanate previously employed in the preparation of polyurethanes. Illustrative of such isocyanates are methylenebis(phenyl isocyanate) including the 4,4'-isomer, the 2,4'-isomer and mixtures thereof, m- and p-phenylene diisocyanates, chlorophenylene diisocyanates, a,a'-xylylene diisocyanate, 2,4- and 2,6-toluene diisocyanate and the mixtures of these latter two isomers which are available commercially, tolidine diisocyanate, hexamethylene diisocyanate, 1,5-naphthalene diisocyanate, isophorone diisocyanate, and methylenebis(cyclohexyl isocyanate) including the 4,4'-isomer, the 2,4'-isomer and mixtures thereof. Preferably the organic polyisocyanate employed in the invention is methylenebis(phenyl isocyanate), in the form of the 4,4'-isomer as well as mixtures of the 4,4'- isomer with amounts (up to about 70 percent by weight of the 2,4'-isomer, and modified forms of this diisocyanate. By the latter are meant those forms of methylenebis(phenyl isocyanate) which have been treated to render them stable liquids at ambient temperature (circa 20° C). Such products include those which have been reacted with a minor amount (up to about 0.2 equivalents per equivalent of polyisocyanate) of an aliphatic glycol or a mixture of aliphatic glycols such as the modified methylenebis(phenyl isocyanates) described in U.S. Pat. Nos. 3,394,164; 3,644,457; 3,882,571; 4,031,026; 4,115,429; 4,118,411; and 4,299,347. The modified methylenebis(phenyl isocyanates) also include those which have been treated so as to convert a minor proportion of the diisocyanate to the corresponding carbodimide which then interacts with further diisocyanate to form urethane-imine groups, the resulting product being a stable liquid at ambient temperatures as described, for example in U.S. Pat. No. 3,384,653. Mixtures of any of the above-named polyisocyanates can be employed if desired.

The isocyanate-reactive material [component (b)] employed in forming the polyurethane used in the present invention can be selected from hydroxy terminated materials, such as polyether polyols, hydroxy-terminated polycarbonates, hydroxy-terminated polybutadiene, hydroxy-terminated polybutadiene-acrylonitrile copolymers, hydroxy-terminated copolymers of dialkyl siloxane and alkylene oxide, such as ethylene oxide, propylene oxide and the like. The component (b) material must have a functionality of at least 1.9, a glass transition temperature (Tg) of less than 20° C., and a molecular weight in the range of about 500 to about 20,000. The glass transition temperature is a well-recognized property. (See, for example, Encyclopedia of Polymer Science and Technology, Vol. 3p. 620, Interscience Publishers, New York, 1965). The preferred molecular weight (wt. average) of component (b) is within the range of from about 1250 to about 10,000 and more preferably between about 2000 to about 8000. The functionality is preferably not greater than 6 and, more preferably, from about 1.9 to 4 and most preferably 1.9–2.5.

The component (b) can be employed in forming the polyurethane used herein in amounts of up to about 20 percent by weight, preferably from 0 to about 7 percent by weight and most preferably from 0 to 5 percent by weight. In certain instances, it is most preferred to have the polyurethane formed without the utilization of component (b) or with very small amounts of this component (b) [i.e. up to about 2 wt. %].

Illustrative of polyether polyols are polyoxyethylene glycols, polyoxypropylene glycols which, optionally, have been capped with ethylene oxide residues, random and block copolymers of ethylene oxide and propylene oxide, propoxylated tri- and tetrahydro-alcohols such as glycerine, trimethylolpropane, pentaerythritol, and the like, which propoxylated compounds have been capped with ethylene oxide, polytetramethylene glycol, random and block copolymers of tetrahydrofuran and ethylene oxide and or propylene oxide, and product derived from any of the above by reaction with di-or higher functional carboxylic acids or esters derived from said acids in which latter case ester interchange occurs and the esterfying radicals are replaced by polyether polyol radicals. Advantageously, the polyether polyols employed as component (b) in the polyurethanes of the invention have a primary hydroxyl group content of at least 80 percent. The preferred polyether polyols are random and block copolymers of ethylene and propylene oxide of functionality approximately 3.0 and polyimidomethylene glycol polymers of functionality greater than or equal to 2.0.

In a particular embodiment of the invention the component (b) which is employed can be a polyol obtained by reacting any of the above polyether polyols with a di- or trifunctional aliphatic or aromatic carboxylic acid to form the corresponding polyetheresters. Examples of acids which can be used are adipic, azelaic, glutaric and the like.

The polyether polyols which can be employed as component (b) also include the vinyl reinforced polyether polyols, e.g. those obtained by the polymerization of styrene and or acrylonitrile in the presence of the polyether.

Illustrative of polyester polyols are those prepared by condensation polymerization by esterification of polycarboxylic acids such as phthalic terephthalic, succinic, glutaric, adipic, azelaic and the like acids with polyhydric alcohols such as ethylene glycol, butenediol, glycerol, trimethylolpropane, 1,2,6-hexanetriol, cyclohexanedimethanol and the like. A preferred group of polyesters are those obtained by esterifying a dimeric or trimeric fatty acid, such as oleic acid, with a relatively long chain-aliphatic diol such as hexane-1,6-diol and the like.

Illustrative of polycarbonates containing hydroxyl groups are those prepared by reaction of diols such as propane-1,3-diol, butane-1,4-diol, hexan-1,6-diol, diethylene glycol, triethylene glycol, dipropylene glycol, bisphenol A and the like with diarylcarbonates such as diphenylcarbonate or with phosgene.

Illustrative of the silicon-containing polyethers are the copolymers of alkylene oxides with dialkylsiloxanes such as dimethylsiloxane and the like; see, for example, U.S. Pat. No. 4,057,595.

Illustrative of the hydroxy-terminated polybutadiene copolymers are the compounds available under the trade name Poly BD Liquid Resins from Arco Chemical Company. Illustrative of the hydroxy- and amine-terminated butadiene/acrylonitrile copolymers are the materials available under the trade name HYCAR hydroxyl-terminated (HT) Liquid Polymers and amine-terminated (AT) Liquid Polymers, respectively.

Component (c) which is used in preparing the polyurethane found useful in preparing the sheet product and resultant separator of the invention are inclusive of aliphatic straight and branched chain diols, including cyclo aliphatic diols, preferably having from about 2 to 8 carbon atoms, inclusive, in the chain. Illustrative of such diols are ethylene glycol, 1,3-propanediol, 1,4butanediol, 1,5-pentanediol, 1,6-hexanediol, 1,2propanediol, 1,3-butanediol, 2,3-butanediol, 1,3pentanediol, 1,2-hexanediol, 3-methylpentane-1,5-dio., 1,4-cyclohexanediol and the like including mixtures of two or more such diols. The extenders, which can be used alone or in admixture with each other or any of the above diols, also include diethylene glycol, dipropylene glycol, tripropylene glycol, and the like, as well as ester diols obtained by esterifying adipic, azelaic, glutaric and like aliphatic dicarboxylic acids with aliphatic diols such as those exemplified above utilizing from about 0.01 to about 0.8 mole of acid per mole of diol. Also included in the extenders which can be used in preparing the polyurethanes useful in this invention are the adducts obtained by an aliphatic diol or triol such as 1,4-cyclohexanedimethanol, neopentyl glycol, hexane-1,2-diol, ethylene glycol, butane-1,4-diol, trimethylolpropane and the like with e-caprolactone in a mole ratio of from 0.01 to 2 moles of caprolactone per mole of diol or triol.

A preferred polyurethane are those in which the polyisocyanate is a diisocyanate, such as methylene bis(phenylisocyanate) (MDI). The active hydrogen containing component (b) is selected from a polycarbonate, polysilicon ether as described above and it is preferred that component (b) be either substantially absent or present in short amounts of up to about 2 wt. percent of the polyurethane. The component (c) is selected from a short chain aliphatic or an alicyclic diol such as 1,5-pentanediol, hexane-1,6-diol, 1,4-cyclohexanediol or 1,4-cyclohexanedimethanol or mixtures thereof. For example, polyurethanes formed from MDI and cyclohexanediol or cyclohexandimethanol in ratios of 1.0 to 1.05:1 are useful herein.

The thermoplastic polyurethane useful herein normally have a weight average molecular weight of from about 50,000 to about 3,000,000 and preferably, from about 350,000 to about 3,000,000. Blends of different molecular weight materials can be used.

The polyurethane component of the subject invention can be the sole polymeric component used in producing the subject battery separator or can be used in combination with a minor amount (preferably up to about 40 wt. percent, most preferably up to about 25 wt. percent) of other polymers which are compatible with the polyurethane (do not phase segregate), are stable (substantially inert from attach and decomposition by the battery components) to the battery environment for which the present separator is intended to be used. Examples of such supplemental polymers include polysulfones, halogenated polyolefins, polyacrylonitriles, polyolefins, polycarbonates, polyurethanes, polyalkacrylic or polyacrylic acid and their esters, and the like as well as mixtures and copolymers thereof.

It has been found that a tough, yet flexible sheet product can best be formed by having the polymeric component be formed from a composition composed of a mixture of thermoplastic polyurethane and from 0.5 to 10 weight percent (preferably 1.5 to 7 wt %) based on the polymeric mixture of a polyacrylic acid or polyalkacrylic acid (e.g., polymethacrylic acid) or alkyl ester thereof (e.g., a $C_1$–$C_3$ ester). The preferred mixture is formed from polyurethane with a polyacrylic acid or a polyalkacrylic acid. Sheet products formed with the above-described mixtures exhibit a combination of toughness and flexibility to provide battery separators which can maintain integrity under the adverse conditions found in operating batteries.

The polymer or blend of polymers, as described hereinabove, should be soluble in a first liquid while being substantially insoluble in a second liquid (including mixtures of minor amounts of first liquid and major amounts of second liquid) and wherein the first and second liquids are miscible to a high degree with one another. The polymer should be soluble in the first liquid in dosages of at least about 5 wt. percent, preferably from about 10 to 30 wt. percent. High solubility (about 15–30 wt. %) within the first liquid is preferred. The first liquid can be a polar organic liquid, such as N-methylpyrrolidone, dimethylformamide, diethylformamide, dimethylacetamide and the like or a halogenated hydrocarbon such as dichloroethane, trichloroethane, tetrachloroethane, trichloropropane and the like. The polar solvents having lower rates of vaporization are preferred as they readily form a solution with polysulfones and do not evaporate during the preferred mode of forming the subject separator, as described herein below. The second liquid can be chosen from water, or organic liquids which are miscible with the first liquid and incapable of dissolving the polymer. Such liquids include water, methanol, ethanol, ethylene glycol, glycerol, and the like. Water is the preferred second liquid. The second liquid should be used alone or with a minor amount (up to 40% and preferably up to 30%) of first liquid as the total weight of solution. High concentrations should be avoided (most preferred to have very low concentrations of up to about 20%) in providing the subject separator product.

The filler to be used in forming the polymer/filler/first liquid mixture, described above and the resultant polymer/filler matrix of the sheet product of this invention should be a particulate material having high surface area (BET; such as 20 to 950 $m^2$/gm, preferably at least 100 $m^2$/gm), high porosity (BET; at least about 0.2 cc/gm; preferably at least about 1 cc/gm). The size of the ultimate (non-agglomerated) filler particulate material should be ultra small with an average diameter of from about 0.01 to about 75 microns, preferably from about 0.01 to about 50 microns. The filler should be substantially free of large (greater than 100 microns) diameter particulate material whether as ultimate or agglomerate material. The filler must be inert with respect to the battery environment and must be substantially insoluble with respect to the first and second liquids when used in forming the subject sheet product, as fully described hereinbelow.

The particulate material used as filler component of the subject sheet product can be selected from a variety of materials such as metal oxides and hydroxides as, for example, oxides and hydroxides of silicon, aluminum, calcium, magnesium, barium, titanium, zirconium, iron, zinc and tin; metal carbonates as, for example, carbonates of calcium and magnesium; minerals as, for example, mica, vermiculite, montmorillonite, kaolite, attapulgite, talc, and diatomaceous earth; synthetic and natural zeolites; silicates as, for example, calcium silicate, aluminum polysilicates, alumina, and silica gels; cellulosic materials as, for example, wood flours, wood fibers, and bark products; and glass particles as, for example microbeads, hollow microspheres, flakes and fibers. Carbonaceous material as, for example, carbon black, acetylene black, coal dust, and graphite may be used in small amounts in combination with the other particulate material. Particulate material which is inert to a battery system can be mixed to form the total filler content.

As stated above, the filler must be selected with respect to the battery environment with which the subject separator is intended for use. That is to say the particulate filler must be inert with respect to such end use battery environment. Therefore, alkali insoluble particulate such as titanium dioxide (preferred), oxides hydroxides and carbonates of calcium, magnesium, iron and the like should be used only in sheet products which ultimately are formed into battery separators for alkaline batteries. Similarly, acid insoluble particulates such as silica (a precipitated silica is preferred), and the like should be used only in sheet products which ultimately are formed into battery separators for acid batteries. Certain particulates can be used in either acid, alkaline or neutral battery systems and include carbon, coal dust, graphite and barium sulfate. Particulate materials which are inert to a battery system can be mixed to form the total filler content used in the sheet product.

The sheet product of the present invention has a porous sheet contained within the thickness of the sheet product. The sheet can be in the form of a scrim or woven or non-woven fabric or a knit material and can be formed from a continuous or non-continuous fibrous material. The material used to form the sheet component of the sheet product must be a material which is inert to the battery environment. Although the sheet component is contained in the interior of the sheet product's thickness, it is contacted with electrolyte solution (including cathodic and anodic material in the solution) as the solution passed through and is contained in the separator. Thus, the material can be, for example, selected from glass, polyolefin, polyester or polyacrylonitrile polymer filaments or mixtures or copolymers formed with other stable monomeric units (i.e. polyacrylonitrile/polyacrylic acid copolymer; polyolefin/polyacrylic acid copolymer) when the sheet product is used to form a battery separator for acid battery utility. Sheets formed from polyamides and the like are suitable to form sheet products used to form separators for alkaline battery application. The sheet may be planar (that is, have substantially planar major surfaces) or patterned (that is, have patterned elevated and depressed sections of the major surfaces. It is preferable to utilize a planar sheet to assure that the sheet is contained within the body (or thickness) of the sheet product. The sheet is preferably formed from a substantially uniform, thin denier thread (denier of from about 0.02 to 10) to also assure that the sheet is contained within the body of the sheet product. The sheet should have a tensile strength of at least 5 p.l.i. The particular thickness of the sheet should be less than about 0.8 (preferably less than about 0.6) of the thickness of the sheet product. The sheet should extend for substantially the full length and breadth of the resultant sheet product.

The sheet product of the present invention can be formed by various means. Generally, the polyurethane and particulate material are mixed together with the first liquid to provide a substantially uniform polymer/filler/first liquid composition (sometimes referred to as the "dope composition"). The polymer may be present in from about 5–30 (preferably 10–20) wt. percent and the filler may be present in from about 5–40 (preferably 10–20) wt. percent of the total dope composition. In a preferred embodiment, 1 part (by wt.) polymer, 1 part filler and 8 parts first liquid comprising a polar solvent are used to form a dope composition. The amount of polymer and filler used should be such that their ratio is substantially the ratio of polymer/filler required in the resultant sheet product. Normally this is 1:4 to 4:1 and preferably 1:1.5 to 1.5:1. The amount of first liquid used to make the dope composition must be sufficient to provide a composition having a viscosity of about from 100 to about 10,000 cps (Brookfield viscometer #3 spindle at 12 rpm) preferably from about 500to 8000 cps to be sufficiently viscous to have "body" when combined with the sheet, as described hereinbelow. To enhance the viscosity of the dope, one can add an effective amount of a viscosifying agent provided such agent is inert to the battery environment or is soluble in the second liquid and thereby removed along with the first liquid.

Another embodiment of the present invention provides a battery separator having low content (0 up to about 20 weight percent, preferably from 0 up to about 10 weight percent) of particulate filler, as described hereinabove. When low filler content is desired, it has been unexpectedly found that the filler can be removed provided the polymer component is composed of a major portion of a thermoplastic polyurethane with a minor portion of a structure enhancing agent. When such low-filler content sheet product is formed, the resultant separator is capable of maintaining its high void volume, exhibits very low electrical resistance when in the battery system (in comparison to sheet product void of structure enhancing agent) and exhibits high tensile strength.

The structure enhancing agent useful in the present invention when low-level filler separator is desired should be capable of exhibiting a combination of properties with respect to the particular thermoplastic polyurethane/first liquid and with respect to the resultant sheet product. Firstly, the agent should be capable of increasing the viscosity of the thermoplastic polyurethane/first liquid by a factor of at least about 5 fold and preferably at least about 10 fold. Thus, a thermoplastic polyurethane/first liquid having a viscosity of about 50 cps will have a viscosity of at least about 250 cps, preferably 500 cps (Brookfield, #4, 50 rpm) when the agent is made part of the dope composition. Secondly, the agent should be substantially insoluble in the second liquid or capable of being at least partially retained (such as a polymer alloy) in the sheet product after subjection to second liquid. Thirdly, the agent must be, similar to the thermoplastic polyurethane, stable with respect to the battery system contemplated for its use. Fourthly, the agent should aid in enhancing the pore volume of the resultant sheet product vis-a-vis sheet products formed from thermoplastic polyurethane without the agent. Fifth, the agent should be capable of imparting enhanced (i.e. lower) electrical resistance properties to the resultant separator (compared to sheet product without agent).

The formed separator unexpectedly exhibits the combined properties of high void volume, low electrical resistance, good physical strength and stability over extended periods of time, as required for a superior battery system. The separator is composed of a polymeric component formed of a mixture of a thermoplastic polyurethane and from about 0.1 to 15 weight percent (preferably about 1.5 to 10 wt. percent) based on the total weight of the polymer component of a structure enhancing (viscosifier/surfactant) agent as, for example, a polycarboxylic acid polymer salt or a polysulfonic acid polymer salt based on the total polymer content. In addition to the thermoplastic polyurethane/agent mixture, the sheet product may contain low-levels of particulate filler as, for example, of from 0 to about 20 weight percent, preferably from about 0 to 10 weight percent. The initially formed dope composition should contain the thermoplastic polyurethane and the agent (and, where desired, filler) in ratios appropriate to attain the above composition when the first liquid of the dope is removed. The amount of thermoplastic polyurethane contained in the dope may be from about 5 to 30 (preferably 10–20) weight percent with the agent and, if used, filler being in amounts dictated by the desired composition of the resultant sheet product and by the required dope viscosity, as described below.

The preferred structure enhancing agents for the thermoplastic polyurethane are polycarboxylic acid polymer salts or polysulfonic acid polymer salts, as described herein below (each referred to herein as "second polymer").

The polycarboxylic acid polymer salt can be formed from any polymeric hydrocarbon having aliphatic carboxylic acid groups pendent from the polymer's backbone chain. The preferred polycarboxylic acid polymers are polyacrylic acids, poly ($C_1$–$C_5$ alk)acrylic acids, copolymers of acrylic acids and alkacrylic acids as well as polymers and copolymers of said materials with other monomeric units such as acrylonitrile, an alkylene (e.g. butadiene, isoprene, ethylene, and the like). Preferred polymers are polyacrylic acid or polymethacrylic acid homopolymers or those which have only small amounts (e.g. less than 10%) of copolymer units. The most preferred polymers are acrylic acid polymers of high molecular weight which are crosslinked with a polyalkenylpolyether. (Sold under the trademark "Carbopol")

The polysulfonic acid polymer salts can be selected from any polymeric hydrocarbon having aliphatic free sulfonic acid groups or aliphatic sulfonyl chloride groups pendent from the polymer's backbone chain. Such polymers include for example, polyvinylsulfonic acid, polychlorovinyl sulfonyl chloride (sold under the trademark "Hypalon") and the like.

The polymer acids used to form the salts should be of a high weight average molecular weight of at least about 250,000. It is preferred that the polymer be of a molecular weight of from about 400,000 to about 5,000,000 and most preferably of from about 1,000,000 to 5,000,000. These polymers (as the salt) should be miscible with and swelling in the first liquid while being substantially insoluble or at least retainable therein as a polymer alloy with the thermoplastic polyurethane in the second liquid used in forming the subject separator. The particular liquids and thermoplastic polyurethane used in forming the separator will dictate the composition of the agent or second polymer to be used. The solubility characteristics of the second polymer can be readily determined by one skilled in the art by conventional techniques. The agent to be used for swelling and viscosity increase is determined by matching solubility, hydrogen bonding and dipole moment of the first liquid and polymer blend.

The second polymer should be at least partially neutralized by forming a salt of the carboxylic acid or sulfonic acid units. Such neutralization may be attained with from about 0.1 to 1.01, preferably from about 0.25 to 1 molar ratio of a base such as an alkali or alkaline earth metal oxide or hydroxide when the resultant separator is contemplated for use in an alkaline battery system. In the case of acid battery separators, it has been unexpectedly found that a base in the form of organic amines, in particular secondary and tertiary amines, can be used to form the polymer salt to be included in the battery separator product and that such product is stable in and not detrimental to the battery environment. The amine can be selected from dialkyl and trialkyl amines wherein each alkyl is independently selected from a $C_2$ to $C_{20}$ alkyl group or a $C_2$–$C_{10}$ hydroxyalkyl group (preferably a higher alkyl such as a $C_6$–$C_{20}$ alkyl or a $C_3$–$C_8$ hydroxyalkyl) such as diamylamine, triamylamine, triisopropylamine, diisopropanolamine, dihexylamine, di(2-ethylhexyl) amine. For example, a thermoplastic polyurethane dope formed with dimethylformamide, N-methylpyrrolidone, diethylene glycol or dimethyl sulfoxide as the first liquid may contain a high molecular weight polyacrylic acid which is at least partially neutralized with diisopropanolamine, triethylamine, di(2-ethylhexyl)amine (preferred) and the like to provide a high viscosity dope.

The resultant dope should have a viscosity of from about 100 to 10,000 cps (Brookfield, #3 spindle, 12 rpm) preferably from about 500 to 8,000 cps to be sufficiently viscous to have "body" when combined with the sheet, as described below.

The polymer/filler/first liquid or polymer/agent/first liquid composition can be impregnated into the sheet in a manner which causes the composition to be uniformly distributed throughout the thickness of the sheet and to extend on each side thereof to form a coating of dope composition on each surface of the sheet. This can be done by various techniques such as dipping, coating, and the like. Whatever manner is used, the dope composition must be contained free of gas bubbles or voids throughout the sheet and on each of the sheet's surfaces. It is preferable to impregnate and coat the sheet by applying the dope composition onto one major surface of the sheet and forcing it through the sheet while maintaining the other major surface substantially free. As the dope penetrates through the sheet in this manner, the air in the sheet's voids is forced to exit via the free surface and the free surface subsequently attains saturation and a coating of the composition. The dope may be applied in more than one application, such as by first applying a low viscosity (e.g. 400 to 1000 cps with #4 spindle at 50 rpm) dope and subsequently applying to at least one surface a higher viscosity dope. The impregnated porous sheet should be free of air voids and bubbles.

The impregnated porous sheet is then contacted with the second liquid, as described above, to coagulate and solidify the polymeric component with its filler, where appropriate, while simultaneously removing the first liquid from the sheet composite. The second liquid should contact both surfaces of the previously impregnated sheet in a manner which provides for substantially equal and concurrent rates of removal of the first liquid from the fibrous sheet. The mixed liquid should be removed and replaced with fresh second liquid to retain low concentration of first liquid in the contact bath. In this manner it has been found that the average pore size (diameter) of the pores at each major surface is substantially equal and less than that of the pores located in the internal section of the resultant sheet product.

It has been found that the formed sheet product of the present invention has porosity composed of pores such that there is a gradient of nominal pore size (the pore size with respect to any specific increment of thickness) increasing from each major surface of the sheet product towards the interior, central portion of its thickness. Generally, the pores exhibit a progressive and substantially continuous increase in pore diameter from each major surface towards the central section without having a major change occur at the region adjacent each major surface (the portion of the sheet products thickness which is immediately adjacent to a major surface and includes the surface, per se, as well). In addition, the sheet product of the present invention preferably has a substantially uniform void volume profile across its thickness.

Although it is common practice to form membranes with the aid of a support member, it is preferred herein that the support sheet should be impregnated with the polymer/filler/first liquid dope composition by applying the dope onto one major surface of the support sheet and forcing it through the sheet while maintaining the other major surface free. As stated above, a second application of dope composition (preferably of higher viscosity) may be applied to one or both surfaces. This mode of application is preferred when applying a low filler content dope composition. The impregnated sheet is processed through a means for regulating its thickness such as by using doctor blades or the like and subsequently immersed into a bath of second liquid in a manner which substantially simultaneously contacts each of the major surfaces of the impregnated sheet to the second liquid. The second liquid should not be allowed to accumulate high concentrations of first liquid therein. Although it is common practice to use a support member in forming membranes, it has been found that all of these steps should be done without the aid of a support member. The resultant sheet product should be washed with fresh amounts of second liquid to cause removal of the first liquid material. For example, when the first liquid is selected from a polar solvent such as N-methyl pyrrolidone, the amine solvent should be substantially completely removed.

The resultant sheet product is a microporous sheet of very high porosity (porosity of 50 vol. percent and even up to 80 vol. percent). The sheet product has a length and breadth and a predetermined thickness which should be less than about 50 mils, preferably less than about 10 mils. Very thin, flexible sheet products having good mechanical properties of tensile strength and modulus of elasticity have been unexpectedly formed. Although it is well known that polyurethanes can be formed into cellular material, such material is normally formed into a thick formation (such as mattress, leather substitutes, etc) and provide very low tensile strengths and poor integrity when formed into thin sheets. Instead, it has been unexpectedly found that the sheet product of this invention provides all of the desired properties for a battery separator including strength, flexibility, very low electrical resistance, good integrity, etc., as well as exhibiting stability in acid and alkaline battery environments.

The resultant sheet product is a material where the porosity is composed of pores such that there is a gradient of average pore size from each major surface toward the interior, central portion of the sheet product's thickness. The average pore size in the region adjacent to each major surface is normally less than about 3 microns, preferably less than about 2 microns and most preferably less than about 1 micron. The interior region of the sheet product contains pores having an average pore size greater than that of the surface region (normally at least about 1.5 times). The overall average pore size may range from 0.01 to about 10 microns. These measurements can be made by scanning electron microscopy and analysis thereof and may be confirmed by mercury intrusion methods.

The resultant sheet product is composed of a polysulfone matrix of substantially a uniform composition. In the case of the highly filled embodiment the filler is substantially uniformly dispersed in the polymer and the polymer/filler weight ratio is from 4:1 to 1:4 and, preferably from 1:1.5 to 1.5:1. In the low-level filler sheet product will have a polymer matrix composition composed of from 2 to 30 (4 to 20 preferred) parts by wt. polysulfone; from about 0.1–5 (0.6 to 2 preferred) parts by weight agent or second polymer; and from 0 to 5 (0–2 preferred) parts by wt. filler. Further, when the sheet product is formed by a dual application, as described above and the second application is applied to one side only, the sheet may be asymmetrically contained within the sheet product's thickness and a minor portion of the sheet's fleece may extend to the surface or beyond. This provides a highly effective anchor means to attach subsequently applied rib material to that surface of the sheet product (commonly used in acid batteries).

The sheet product may contain additional components such as viscosifiers, surfactants, antioxidants, colorants and the like. Such materials can be incorporated in the sheet product by having them made part of the polymer/filler/first liquid composition, as one of the final washes of the second liquid or separately applied by spraying and the like.

The sheet product is a flexible material capable of being folded upon itself and formed into an envelope design. The initially formed sheet product may have a wrinkled configuration (especially when subjected to a free standing coagulation process). These wrinkles are readily removed by subjecting the sheet product to a heated roller or rollers while maintaining the sheet product under tension. The temperature of the heated rollers should be below the glass transition temperature of the particular polymer used (preferably at least about 25° C. below).

The sheet product can be cut into suitable shape to be used as a separator between electrodes of a battery design. The separator must extend the full length and width of the electrode to prevent electrodes of opposite polarity from contacting one another. In certain instances, it is preferred that the separator be void of patterns or other raised sections (generally for alkaline batteries) or may contain raised portions, such as ribs, buttons and the like (generally for acid batteries). The ribs or other raised portions can be formed from any polymeric material capable of adhering to the polymer used to form the base sheet product.

The following examples are given for illustrative purposes only and are not meant to be a limitation on the subject invention, as defined by the appended claims. All parts and percentages are by weight unless otherwise indicated. The electrical resistance was determined by the direct current method as described by J. J. Lander and R. D. Weaver in Characteristics of Separators for Alkaline Silver Oxide-Zinc Secondary Batteries: Screening Methods, ed. by J. Cooper and A. Fleischer, Chapter 6 modified by using 35% $H_2SO_4$ as the electrolyte, $Hg/Hg_2SO_4$ type reference electrodes, and Pt screens as the current carrying electrodes. The voltage drop across the reference electrodes was measured at 20 ma.

EXAMPLE I

A solution was prepared by mixing 120 parts of a thermoplastic, high molecular wt. (about 2 million) polyurethane which is substantially free of polyester and polyether polyols of low functionality (Dow; Isoplast 301), 150 parts precipitated and neutralized (pH =7) silica (Davison, Sylox-2) having an average particle size of 10 microns with particle size range of from 0.2 to 100 microns, 15 parts of deionized water and 1215 parts N-methylpyrrolidone using a high shear mixer (Myers). The solution had a viscosity of 5.33 $\times 10$ cps (Brookfield viscometer with #3 spindle at 12 rpm).

A 0.5 oz/yds$^2$ nonwoven polyester fabric (denier of 2.2) was saturated with the above formed solution by passing the free fabric through a slot of a trough which contained the solution. The solution was thus forced through the web replacing the air to form an air bubble free saturated web of 8 mils thickness. The saturated web traveled vertically from the slot to a water bath where it remained for about 30 seconds before contact with directional rollers. The polymer solidified and a portion of the organics (NMP) was removed by the aqueous bath. The material was then subjected to a second aqueous bath composed of fresh D.I. water at 50° C. for further removal of organics. The formed material was air dried at 60° C. for 3 min. The material was analyzed for residual organic (NMP) by dissolving a sample in THF and analyzing using gas phase chromatography and was shown to have less than 1 percent NMP based on the dry wt. of formed membrane. The morphology, analyzed using scanning electron microscopy, showed very small pores (0.3 or less) on the membrane surface and gradual increase to about 5 microns at the interior center of the membrane. The total void volume of 76 percent was determined by difference between the weight of dried sample and after saturation with isopropanol. The electrical resistance was 1.2 mohm-cm$^2$.

EXAMPLE II

A solution was prepared by mixing 25 parts of polyurethane (Isoplast XU725 MW$_w$=2.5 ×10$^6$) with 400 parts of N-methyl pyrrolidone (NMP) using a high shear mixer. 1.25 parts of polyacrylic acid (Carbopol 940; MW$_w$=4,000,000) and 0.5 parts di(2-ethylhexylamine) in 75 parts of NMP were added to the polycarbonate solution. The solution was thoroughly mixed and had a viscosity of 9.74 ×10$^3$ cps (Brookfield #3 at 12 rpm).

A 0.75 oz/yd$^2$ non woven polyester fabric (Reemay) was saturated with the polycarbonate solution by passing the fabric through the solution (which had been filtered and deaerated) and a double knife blade was used to regulate the dope/fabric thickness. The saturated fabric was then caused to travel in a substantially vertical direction into an aqueous bath remaining therein for about 30 seconds. The sheet product was then washed in a series of aqueous solutions to remove NMP and then air dried at 60° for 5 minutes. The sheet product was cut into samples. The pore morphology was analyzed for SEM and was found to be similar to the sheet of Example I above. The sheet thickness was approximately 6.6 mils, had an electrical resistivity of 5.6 mohm-in$^2$ after a four hour soak in H$_2$SO$_4$ and a porosity of about 56%.

What is claimed:

1. A battery separator comprising a microporous sheet product having a thickness of less than about 50 mils bound by first and second major surfaces of the sheet product, comprising a mixture of from 1:4 to 4:1 wt. ratio of a thermoplastic polyurethane and a particulate filler and having a porous sheet embedded between the first and second major surfaces of said sheet product, and having porosity throughout the sheet product's thickness with a distribution of nominal pore size increasing from each major surface toward the interior, central portion of the sheet product's thickness.

2. The battery separator of claim 1 wherein the pore size distribution is continuous in increase of pore size from each major surface to the interior, central portion of the sheet product's thickness.

3. The battery separator of claim 1 wherein the average pore size of the sheet product is less than about 10 microns, the pore size of the pores in the immediate proximity to each of the first and second major surfaces is equal and less than about 3 microns and the pore size distribution is continuous in increase of pore size from each major surface to the interior, central portion of the sheet product's thickness.

4. The battery separator of claim 1 wherein the filler is selected from an inert inorganic particulate, said particulate having a surface area of from about 20 to 950 m$^2$/gm, a pore volume of at least 0.2 cc/gm, an average particle size of from about 0.01 to 75 microns and is essentially free of particles having particle size larger than 100 microns.

5. The battery separator of claim 1 wherein the ratio of porous sheet thickness to separator sheet product thickness is up to about 0.8 and said porous sheet is a woven, non-woven or knit material formed from 0.02 to 10 denier fiber.

6. The battery separator of claim 1, 2, 3, 4, or 5 wherein the polyurethane is a reaction product of (a) an organic polyisocyanate; (b) from 0 to about 20 weight percent of an active hydrogen containing isocyanate reactive material having an average functionality of at least about 1.9, a glass transition temperature of less than about 20° C. and a molecular weight of from about 500 to 20,000; and (c) at least one active hydrogen containing isocyanate reactive material having a functionality of from 2 to 3 and a molecular weight of from about 50 to about 400 and the overall ratio of isocyanate to total active hydrogen in said reactants is from 0.95:1 to 1.05:1.

7. The battery separator of claim 5 wherein the filler is selected from the group consisting of oxides and hydroxides of calcium, magnesium, titanium, aluminum and mixtures thereof.

8. A battery separator comprising a microporous sheet product having a thickness of less than about 50 mils bound by first and second major surfaces of the sheet comprising a mixture of a thermoplastic polyurethane and from about 0.1 to 15 wt. percent based on the polyurethane of a structure enhancing agent and having a porous sheet embedded between the first and second major surfaces of the sheet product, and having porosity throughout the sheet product's thickness with a distribution of pore size increasing from each major surface toward the internal, interior central portion of the sheet product's thickness.

9. The battery separator of claim 8 wherein the porous sheet within the sheet product thickness is positioned adjacent one of the major surfaces.

10. The battery separator of claim 8 or 9 wherein the agent is selected from the group consisting of a polycarboxylic acid polymer salt or a polysulfonic acid polymer salt formed with 0.1 to 1.01 molar equivalent of base selected from the group consisting of alkali metal, alkaline earth metal or a secondary or tertiary amine.

11. The battery separator of claim 8 wherein the sheet product has the polymer matrix composed of from about 65 to 99.9 weight percent of the polyurethane, from about 0.1 to 15 weight percent of the structure enhancing agent and less than about 20 weight percent of an inert particulate filler.

12. A battery separator of claim 11 wherein the particulate filler is selected from the group consisting of oxides and hydroxides of calcium, magnesium, titanium, aluminium, and mixtures thereof.

13. In a battery having at least one pair of electrodes of opposite polarity, an electrolytic composition and a separator positioned between adjacent electrodes of opposite polarity, wherein the improvement comprises that the separator extends at least the length and breadth of the electrodes and comprises the product of claim 1, 2, 3, 4, 5, 7, 8, 9, 11 or 12.

14. In a battery having at least one pair of electrodes of opposite polarity, an electrolytic composition and a separator positioned between adjacent electrodes of opposite polarity, wherein the improvement comprises that the separator extends at least the length and breadth of the electrodes and comprises the product of claim 6.

15. In a battery having at least one pair of electrodes of opposite polarity, an electrolytic composition and a separator positioned between adjacent electrodes of opposite polarity, wherein the improvement comprises that the separator extends at least the length and breadth of the electrodes and comprises the product of claim 10.

16. A battery separator of claim 5 wherein the filler is selected from oxides of silicon.

17. A battery separator of claim 11 wherein the filler is selected from oxides of silicon.

* * * * *